Nov. 11, 1969    E. ZETTERBERG    3,477,202
DEVICE FOR PLACING THREADED CLOSURES ON CONTAINERS
Filed Nov. 16, 1965    8 Sheets-Sheet 1

INVENTOR
EINAR ZETTERBERG
BY

ATTORNEYS

Nov. 11, 1969   E. ZETTERBERG   3,477,202
DEVICE FOR PLACING THREADED CLOSURES ON CONTAINERS
Filed Nov. 16, 1965   8 Sheets-Sheet 3

INVENTOR
EINAR ZETTERBERG
BY
Strauch Nolan Neale Nies + Kurz
ATTORNEYS

Nov. 11, 1969    E. ZETTERBERG    3,477,202
DEVICE FOR PLACING THREADED CLOSURES ON CONTAINERS
Filed Nov. 16, 1965    8 Sheets-Sheet 5

INVENTOR
EINAR ZETTERBERG
BY

Strauch Nolan Neale Nies + Kurz
ATTORNEYS

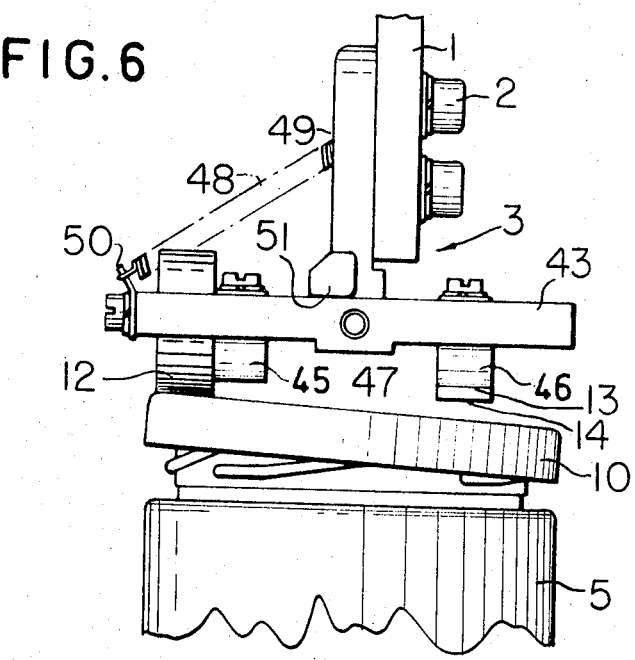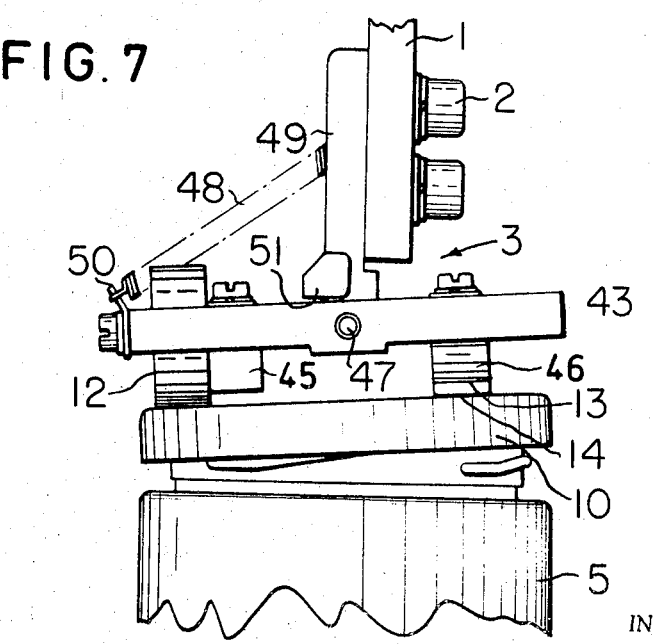

Nov. 11, 1969          E. ZETTERBERG                3,477,202
              DEVICE FOR PLACING THREADED CLOSURES ON CONTAINERS
Filed Nov. 16, 1965                                8 Sheets-Sheet 7
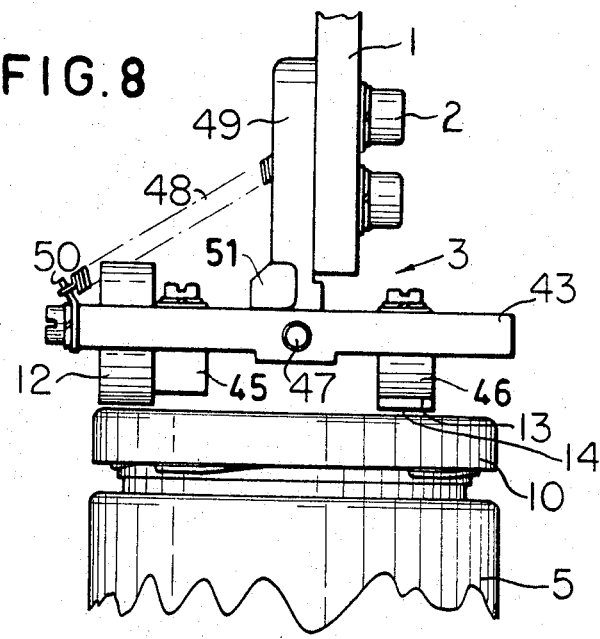
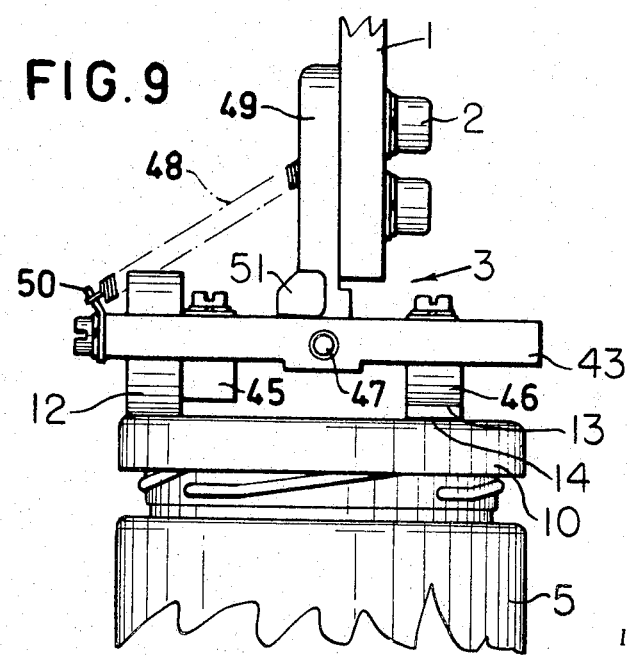
INVENTOR
EINAR ZETTERBERG
BY
*Strauch Nolan Neale Nies + Kurz*
ATTORNEYS Nov. 11, 1969  E. ZETTERBERG  3,477,202
DEVICE FOR PLACING THREADED CLOSURES ON CONTAINERS
Filed Nov. 16, 1965  8 Sheets-Sheet 8
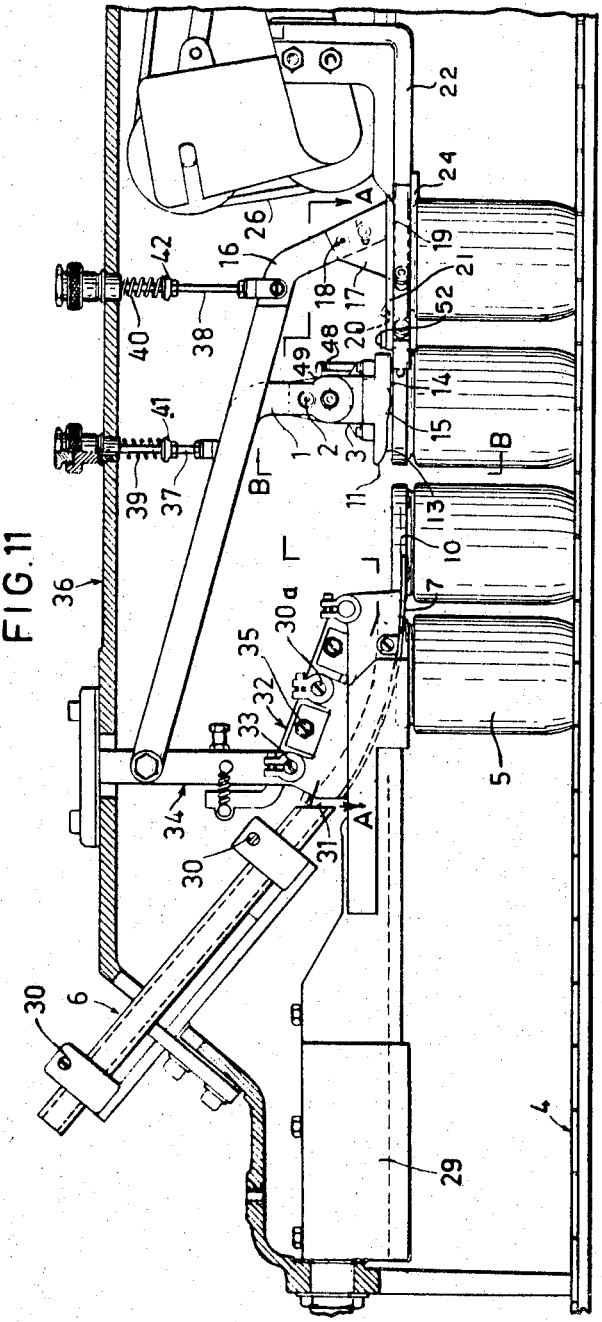
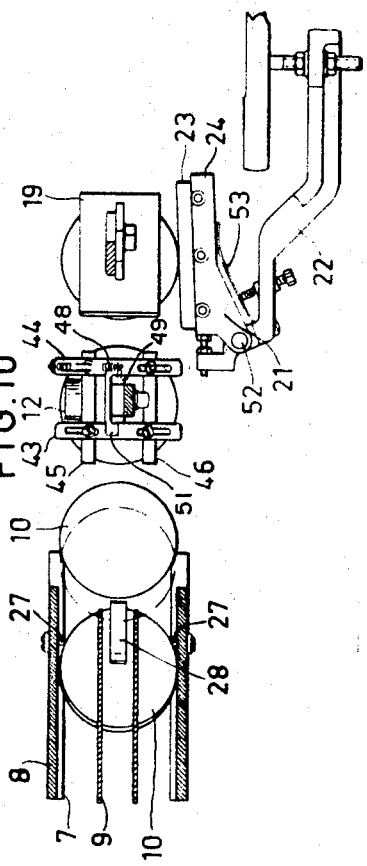
INVENTOR
EINAR ZETTERBERG
BY
Strauch Nolan Neale Nies + Kurz
ATTORNEYS

United States Patent Office 3,477,202
Patented Nov. 11, 1969

3,477,202
DEVICE FOR PLACING THREADED CLOSURES ON CONTAINERS
Einar Zetterberg, Malmo, Sweden, assignor to Aktiebolaget Skane-Emballage, Staffanstorp, Sweden
Filed Nov. 16, 1965, Ser. No. 508,114
Int. Cl. B65b 7/28; B67b 3/20
U.S. Cl. 53—315                                   10 Claims

ABSTRACT OF THE DISCLOSURE

A machine which moves screw top containers along a path and including a device to guide and place screw caps at a location to be picked up by individual containers. A cap placement correcting shoe assembly, located where the cap is placed on a container is tiltably mounted along an axis extending in the direction of movement of the containers and has cap guiding shoes for engaging a misplaced cap resting on the moving container. Near one guiding shoe is a friction member to eccentrically engage the lid and rotate it backwards until the threads fall down on the container threads and to precondition the cap for subsequent tightening on the container.

BACKGROUND

The present invention relates to a device or a machine for placing threaded lids or closures on containers and especially to such a machine which is provided with means for pressing down such closures when they are located on containers.

A known device for placing lids on containers comprises means for supplying the lids to a conveyor for the containers, said conveyor comprising a bottom conveyor and a pair of side conveyors, said side conveyors being driven at the same speed and in the same direction as the bottom conveyor, said side conveyors being adapted to press against opposite sides of the containers in order to prevent said containers from being rotated during the transport. Further, the device comprises a rotating mechanism for rotating and tightening the lids when they have been placed on the containers.

The rotating and tightening device comprises a front endless belt and a rear endless belt, each of said belts comprising in turn one upper and one lower portion, each belt being adapted to run over during driving pulleys which are rotatable about horizontal axes, the arrangement being such that the lids are engaged by said belts at diametrically opposite rim parts. The belts are driven at different speeds with respect to the conveyor, so that each lid will be rotated when the lid is passing under said tightening belts. The tightening belts are flat and relatively broad with respect to their thickness. Guiding means for the belts are provided which comprise an elongated sliding shoe with an even bottom surface. The sliding shoe is carried by a spring biased member which tends to keep down the sliding shoe. The bottom surface of the sliding shoe is provided with a recess which is so located, that the rotating action provided by the tightening belts, when the bottom parts of said belts are passing under said sliding shoe, will be concentrated to oppositely located points on the outermost rim of each lid.

The pulleys carrying the tightening belts are located on a transverse axis which is located near the output end of the conveyor. Said pulleys comprise a driven pulley for one of the tightening belts and a driven pulley with a less diameter for the other tightening belt. At the input side of the conveyor, idling pulleys for the tightening belts are provided. By this means the belt which is driven by the pulley with the greater diameter will be driven at a greater speed and the other belt will be driven at a lower speed than the speed of the conveyor. The driven pulleys for the tightening belts are coaxial and rigidly connected to the pulleys for the conveyor belts which constitute the side conveyors. The pulleys for the side conveyors have a diameter which is smaller than the diameter of the biggest pulley for the tightening belts but correspondingly greater than the diameter of the smallest pulley for the tightening belts.

By this device, which is already known, one of said idling pulleys is carried by a swingable arm which, in turn, is connected to an arm that carries another idling pulley. The device is provided with a belt stretcher in the form of a compressible link, which has one of its ends connected to said swingable arm and the other end connected to a fixed part of the device.

Another known device for placing lids on containers comprises supplying means and adjusting means, said means comprising laterally displaced horizontal lower conveyor rails at the output end of the supplying means, said rails being adapted to support the lids or closures from below in a horizontal position, and said means further comprising resilient members which are adapted to press against the overside of the lids or the closures.

In this device the first means for keeping down the lids extends rearwards with one part above said rails for keeping the lids in a horizontal position when the lids adjust themselves onto the openings of the containers, until each lid is leaving said rails, and another part extended towards the front, said part being adapted to retain the lids in a horizontal position. A second member for keeping down the lids is extending both rearwards and forwards and is adapted to further keep the lids in the horizontal position. The containers are then transported forwards to a tightening mechanism in which the lids are tightened and completely screwed down over the openings of the containers.

SUMMARY

According to the present invention, a primary object resides in the provision, in a machine for placing threaded lids on containers, of a novel pressing shoe for pressing down the lids, said pressing shoe being tiltable around an axis which is parallel to the transport direction of the containers. In conjunction with the preceding object, a further object resides in providing the novel pressing shoe with two parallel spaced apart guiding shoes, laterally adjustable relative to each other and one of which has associated therewith, material having a high coefficient of friction and offset laterally from the center of the containers and lids to engage the lids and rotate them in a direction which would tend to unscrew them from the container.

BRIEF DESCRIPTION OF THE DRAWINGS

In the following, the invention will be described more in detail, reference being had to the accompanying drawings, in which

FIGS. 6, 7, 8 and 9 illustrate a container provided with a lid in different possible positions at the first pressing shoe.

FIG. 10 is a horizontal view illustrating a supplying means for the lids.

FIG. 11 shows on a greater scale a horizontal view of the supplying conveyor, the supplying means and the first and the second pressing shoes for pressing down the lids.

SPECIFIC DESCRIPTION

Figure 1:
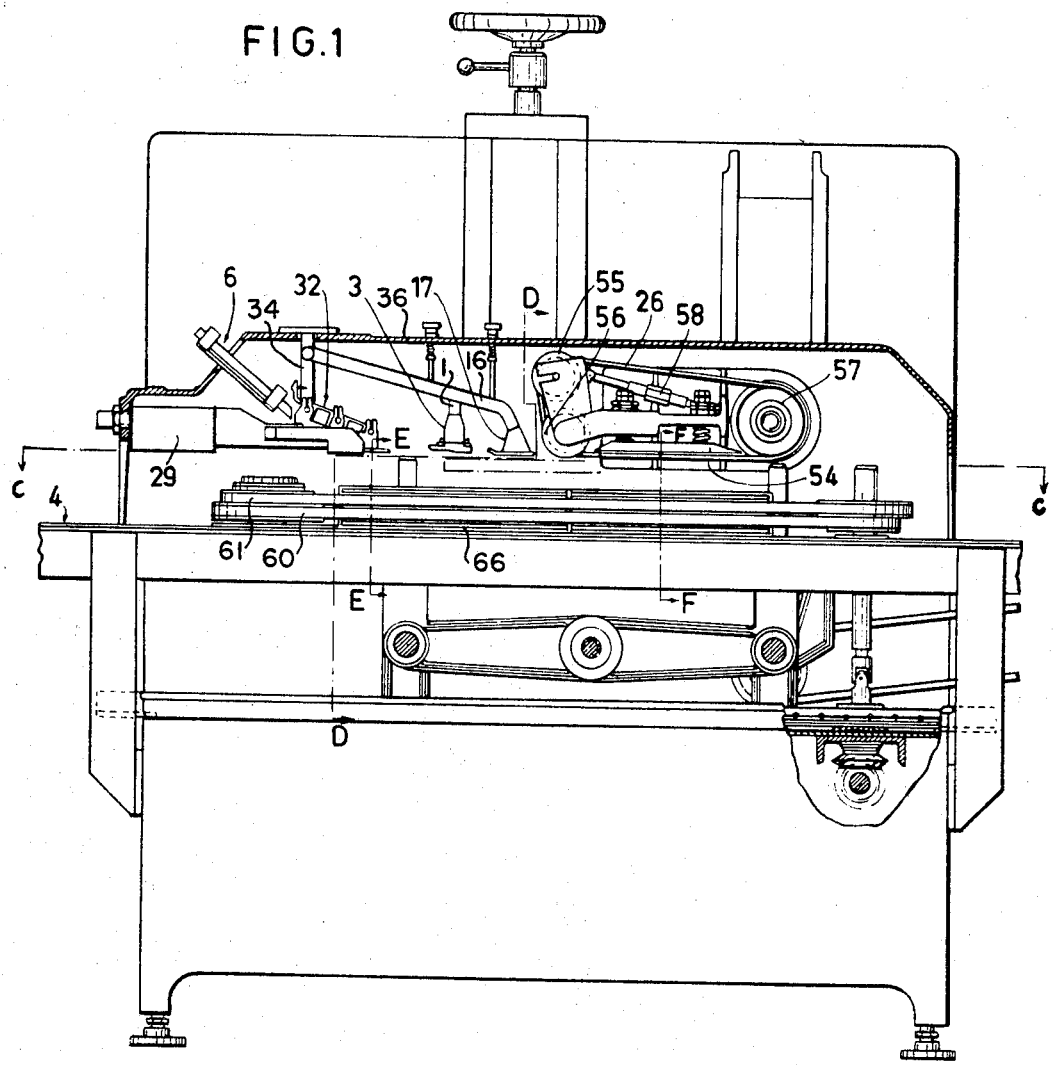
FIG. 1 is a side view, partly in section.
Figure 4:
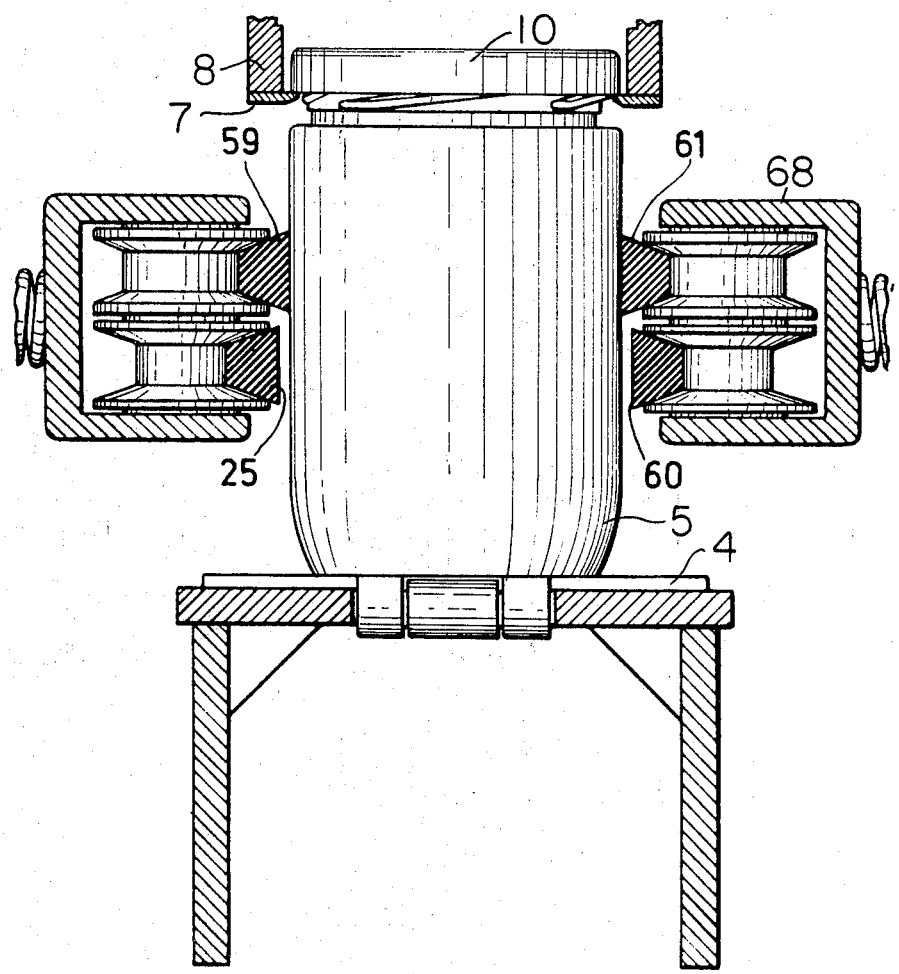
FIG. 4 is a vertical section along the line E—E in FIG. 1.

In the machine seen in elevation in FIGURES 1 and 11, containers 5 are transported through the machine on an endless conveyor 4 which runs over two toothed wheels (not shown). Before the lid is put down on the container, the container is transported through a steam box 29 to which overheated steam is supplied from an overheater located at the input end of the device. By supplying steam to the filled container and by spraying the container with water after the lid has been put thereon, a vacuum is obtained in the container. The steam box and the lid supplying means fastened to said steam box, viz, the channel 6 and the pressing shoes 3 and 17, are adjustable in respect of their vertical position by means of a wheel. The lids may preferably also be heated before they are put on the containers by means of a heating element located under the supply channel 6. The supply channel 6 for the lids consists of two parallel and laterally displaced guides 7 (see FIGURES 4, 10 and 11), each being provided with a side rail 8 for guiding the lids to the output end of the channel 6. The lids are kept in their correct position in the channel by means of a top rail 9. One of the guides 7, 8 can be laterally displaced by means of screws 30, in order to adjust the channel to lids of different diameters. The supplying channel 6 is located at an inclined position above the conveyor 4 in such a way, that the lids by their own weight are transported to the output end 31 of the channel. From the channel 6 the lids are transferred to a supply member 32 which is provided with guides, side rails and a top rail corresponding to said parts of the supply channel 6. The supply member 32 is rotatable about an axis 33, said axis being provided on an arm 34 which extends downwards from the cap 36 of the machine, and which is kept in its correct position by means of a screw spring located between the arm 34 and a bent lever projecting outwardly from the supply member 32. The width of the supply member can be adjusted by means of a screw 30a. Near the output end of the supplying member there is a stop member 27 provided in each of the side rails 8, said stop member going through the side rail and being biased by means of a spring. Said stop members prevent the lids from falling out from the supplying member before they are pulled out, one at a time, by the transported containers 5. The top guide 9 is provided with a leaf spring 28 at one end thereof, said leaf spring extending forwards from the top guide and being adapted to press against the lids for guiding the lids after they have passed the stop members 27. The supplying member 32 is inclined relative to the openings of the transported containers in such a way that the front rim of the outermost lid extends downwards over the container and is caught by such container when the container is transported by the conveyor. When the lid has left the supplying member 32 it falls down on the opening of the container and in this movement it is guided by the leaf spring 28. Now the lid may be located in different positions with respect to the threads on the outside of the container, which will be apparent from FIGS. 6, 7, 8 and 9, and, therefore, the lid will be engaged by the first pressing shoe 3 in different ways.

The first pressing shoe assembly 3, secured to a press arm 1 by screws 2, comprises two guiding shoes 45, 46 which are connected to each other by means of two transverse connecting members 43, 44 so as to be laterally adjustable. One of the guiding shoes 45 is at the outermost side thereof provided with a cylindrical fixed friction member 12. Friction member 12 has a cross section which preferably is circular but which also may have some other shape. It can, for example, be square with rounded corners. Friction member 12 is laterally displaceable for engaging the lid at a suitable point when the lid is lying inclined on a container 5. The friction member 12 will then turn the lid anticlockwise, causing the lid to fall down on the lowermost thread of the container. If the lid, when it has been put down on the container, from the beginning is lying in the lowermost position on the container, the container with the lid thereon will pass beneath the first pressing shoe 3 without being engaged by the latter, which will be apparent from FIG. 8. In order to correct the position of lids, which are put down in an inclined position on the container, the guiding shoes 45, 46 which are rigidly connected to the connecting means 43, 44 are tiltable about an axis 47 which is parallel to the conveyor 4. The guiding shoes 45, 46 are normally kept in a substantially horizontal position by means of a helical spring 48 which extends from a fastening point 49 on the press arm 1 to a fastening point 50 located at the outermost end of the connecting means 44. In rest position, the connecting means 43 abuts against a stop 51. The guiding shoes 45, 46 are rounded or chamfered at the receiving end 11, as can be seen in FIGURE 11, in order to facilitate the reception of the containers with the lids. The lowermost part of one of said guiding shoes 46 is provided with two surfaces 13, 14 located on different levels. One of said surfaces 13 extends from the chamfered end 11 through a transition zone 15 to the other surface 14. In such cases when a lid, which has been supplied from the supplying means 32, is lying on the uppermost thread of the container (as illustrated in FIG. 9) the lid will be engaged by the friction member 12 as well as by the guiding shoe 46. Due to the relatively great friction between the friction member 12 and the lid, the lid will be turned in an anticlockwise direction (it will be opened) and by this movement it will fall down on the lowermost thread. If the lid has been supplied in an inclined position in one or the other direction the lid will be engaged by the first pressing shoe 3 in such a way which will be apparent from FIGS. 6 and 7, i.e. it will be actuated only by the friction member 12 or by the friction member 12 as well as by the guiding shoe 46. In the latter case, a tilting of the pressing shoe about the axis 47 will take place. In both cases the lid will be turned anticlockwise and will fall down on the lowermost thread.

From the first pressing shoe 3 the containers with the lids located thereon will be transported by the conveyor 4 to a second pressing shoe 17, seen best in FIGURES 10 and 11. This pressing shoe 17 comprises a flat, substantially horizontal guiding shoe 19 with an upturned part 20 at its receiving end, for facilitating the reception of the containers with the lids. This second pressing shoe 17 is, like the pressing shoe 3, fastened to an arm 16 which is adjustable in vertical direction by means of a bolt 38. The bolt 38 extends upwards through the cap 36 of the machine and can be screwed upwards and downwards by means of an adjusting screw. The bolt is spring biased by means of a pressing spring 40, which presses on a collar 42 of the bolt. Thus, the pressing shoe 17 is resilient in a vertical direction. The pressing shoe 17 is tiltable about a horizontal axis 18 which makes a right angle to the conveyor 4. The press arm 1 for pressing shoe assembly 3 has an adjustable spring biasing assembly similar to the one described for shoe 17 and includes an adjusting bolt 37, a spring 39 and collar 41 on bolt 37.

Adjacent to the second pressing shoe 17 there is a pre-tightener 21, which is located at the side of the conveyor (see FIGURE 10). Said pre-tightener engages the side of the lid at the same time as the pressing shoe 17 presses the lid against the container. The pre-tightener is arranged on an arm 22 and is provided with a friction member 23 on a holder 24. By the engagement between the friction member 23 and the lid a pre-tightening of the lid will take place. The holder 24 is rotatable about a vertical axis 52 and is pressed against the lid by means of a leaf spring 53. The tension of the leaf spring may be adjusted by means of a screw.

Figure 2:
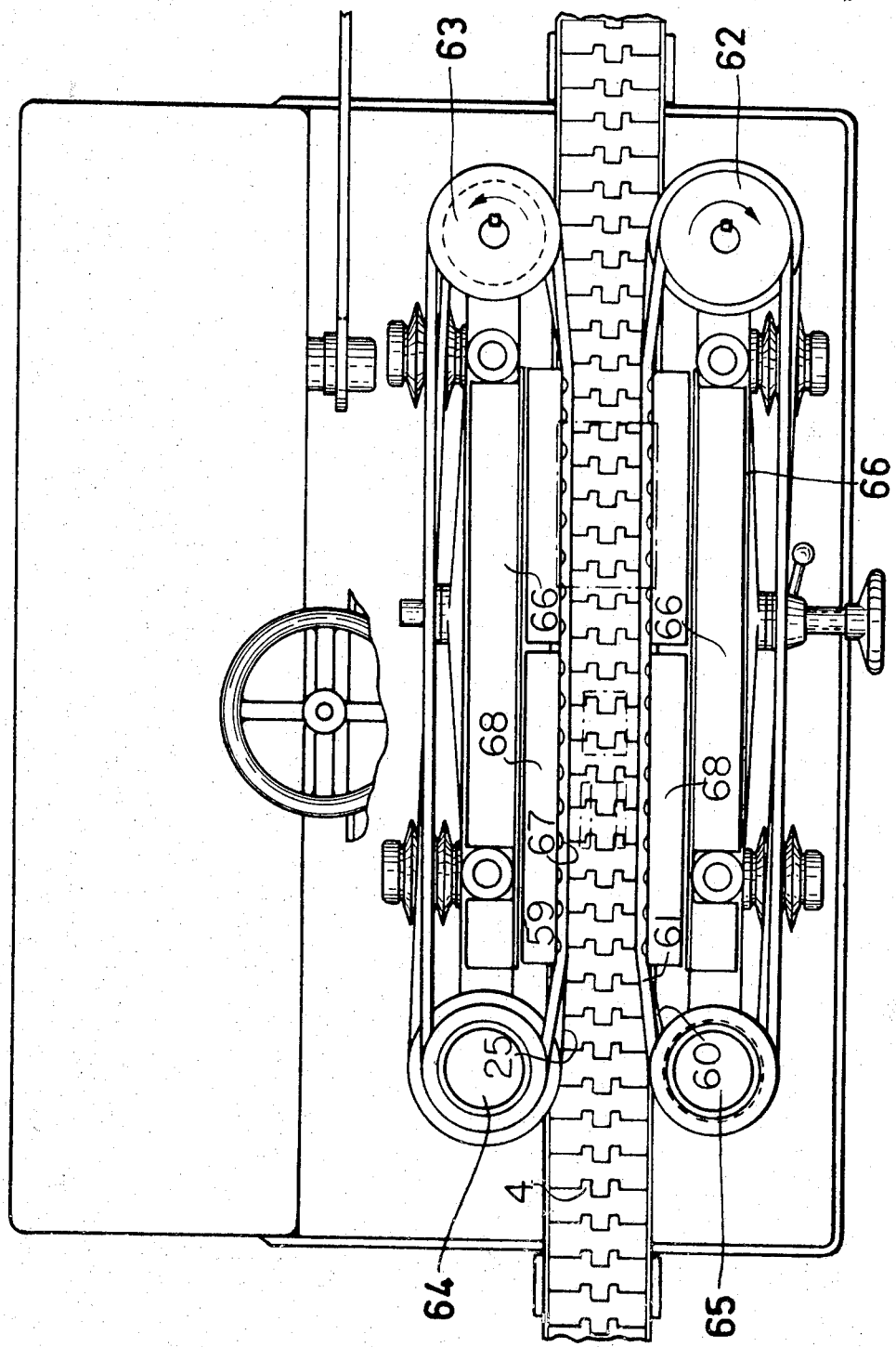
FIG. 2 is a horizontal section along the line C—C in FIG. 1, as viewed in the direction of the arrows.
Figure 3:
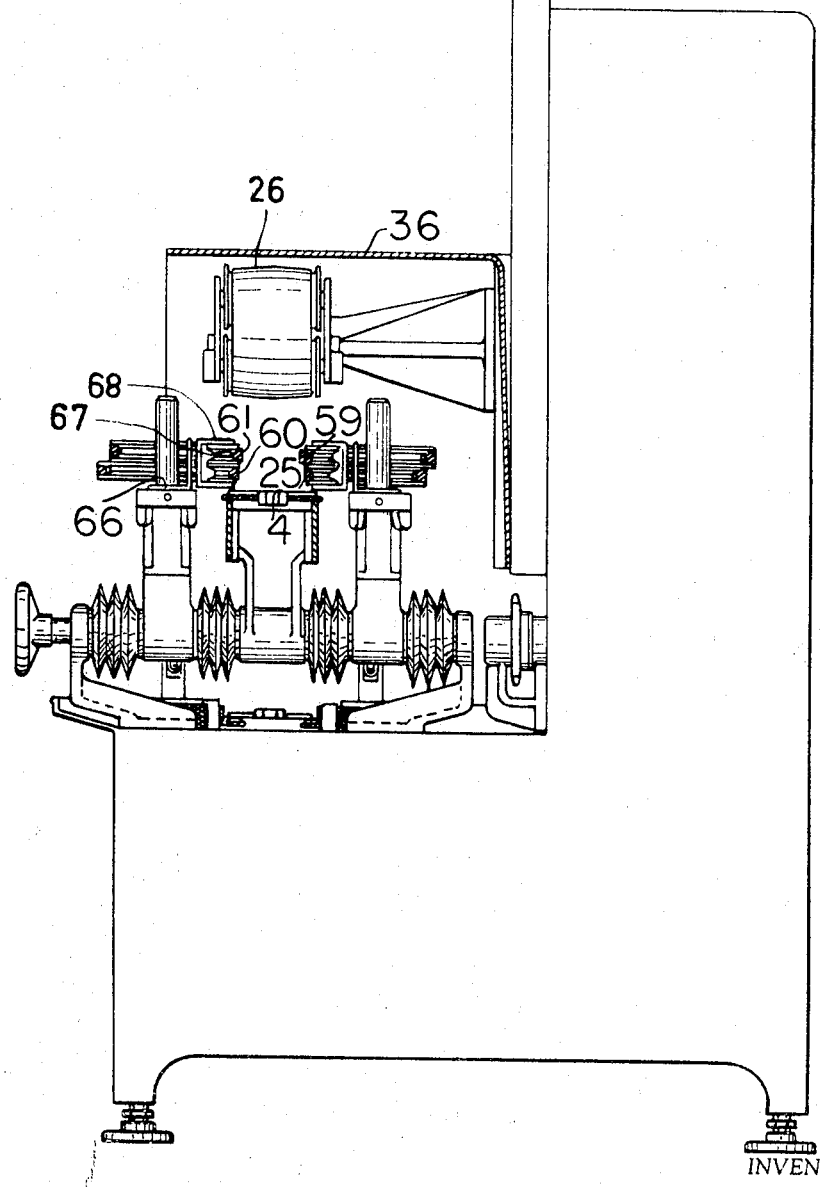
FIG. 3 is a side view, partly in section, along the line D—D in FIG. 1, some parts of the device being removed in this figure.
Figure 5:
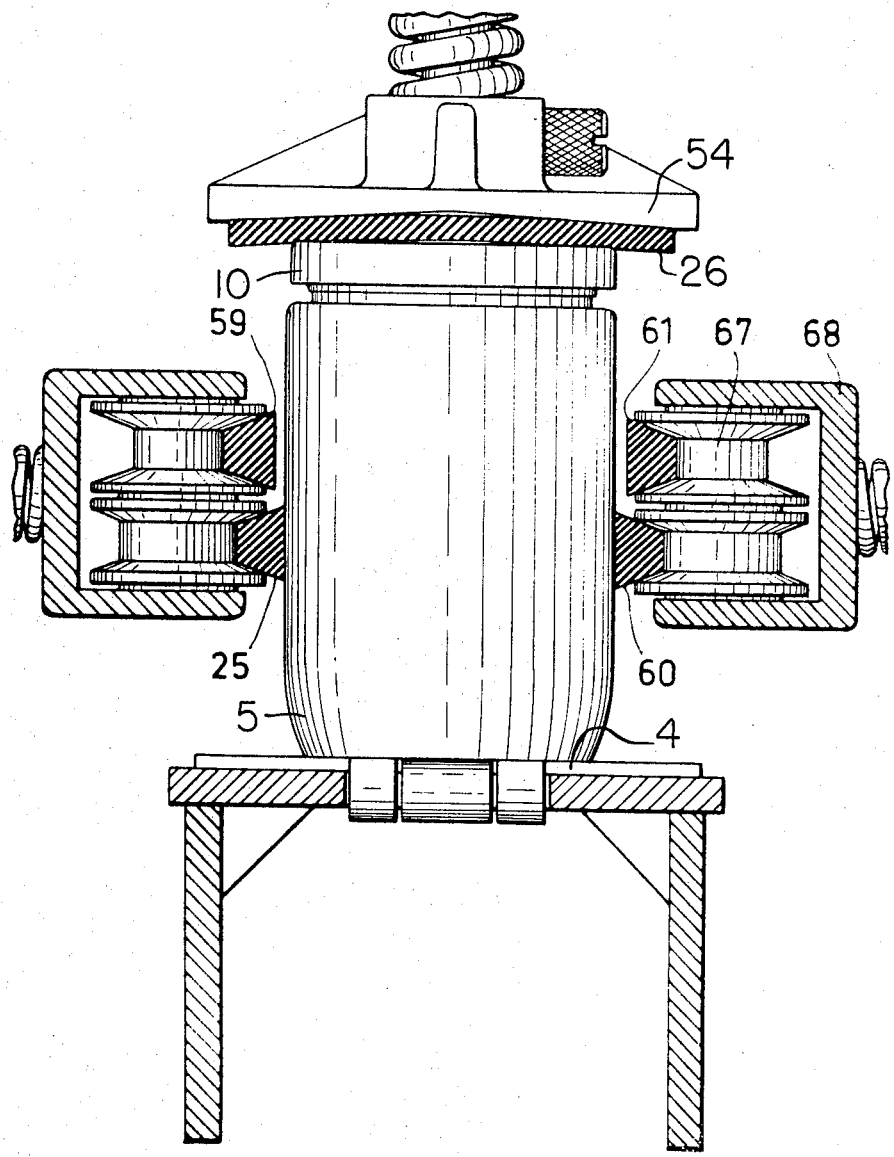
FIG. 5 is a vertical section along the line F—F in FIG. 1.

After the containers with the pre-tightened lids have passed the second pressing shoe 17 and the pre-tightener 21, the containers are further transported under a lid holder belt 26 (see FIGURES 1 and 5) arranged above the containers. The lid holder belt is moved forwards under a pressing plate 54 for adjusting the pressure against the lids. The lid holder belt 26 runs over three belt pulleys 55, 56, 57 of which one is connected to a belt stretcher 58. The pressing plate 54 is spring biased and adjustable in a vertical direction. When the containers are transported under the lid holder belt 26 the final tightening of the lids is taking place. This is carried out in that way, that the lid holder belts keep the lids in a fixed position, thus preventing them from being rotated, while the containers during the transport under the lid holder belt 26 are engaged at both sides by the tightening belts 25, 60 which are parallel to each other and located in the same horizontal level. The tightening belts 25, 60 are adjustable in vertical direction by means of adjustable guides 66 (see FIGURES 2 and 3). They should be so adjusted, that the containers are engaged by the tightening belts at diametrically opposite points located at about half the height of the containers. The parts of the tightening belts are both moving in the same direction as the conveyor 4, one of said parts moving at a greater speed and the other of said parts 25 moving at a lower speed than the conveyor. Thus, the containers are rotated while the lid is passing under the lid holder belt 26.

During the transport of the containers from the input end of the machine to that position in which the tightening belts engage the containers, the containers are supported by side conveyors 59, 61 located one at each side of the containers. The guiding means for the side conveyors and for the tightening belts comprise rollers 67 which are rotatable about vertical axes. The tightening belts and the side conveyors are spring biased towards the containers, because said axes are mounted in U-shaped rails, which are laterally displaceable and actuated by helical springs, as will be apparent from FIG. 5.

What I claim is:

1. In a machine for supplying and applying lids to open containers transported along a predetermined path, a device for correctly locating the lids on the moving containers comprising: a mounting means, a position correcting shoe assembly disposed above the path of the containers and having means adapted to eccentrically engage and correctly position the initially placed lid on a container, and means securing said shoe assembly to said mounting means enabling tilting of said shoe assembly about an axis which is disposed substantially parallel to and in the same direction as the path of movement of the containers.

2. A device as defined in claim 1, wherein said means which is adapted to eccentrically engage and correctly position a lid comprises a friction means on said shoe assembly adjacent one of its sides and adapted to engage a rim portion of an incorrectly located lid.

3. A device as defined in claim 2, wherein said friction means has a rounded cross-section fore and aft relative to the direction of movement of the conveyor.

4. A device as defined in claim 2 wherein means in said shoe assembly adjustably secures said friction means enabling shifting adjustment in a direction transverse to the transport direction of the containers.

5. A device as defined in claim 1, wherein said shoe assembly includes two guiding shoes mounted parallel with and spaced apart laterally from each other and means mounting said shoes to enable lateral adjustment of said shoes relative to each other.

6. A device as defined in claim 5, wherein spring means are connected between said shoe assembly and said mounting means and maintain said shoe assembly with said shoes disposed substantially horizontal.

7. A device as defined in claim 5, wherein the portion of one of said guiding shoes which faces down toward the container lids is provided with an upturned leading end and with two substantially flat surfaces located at different levels, and a transition surface therebetween, one of said flat surfaces extending from said upturned end to the transition surface which leads into the other of said surfaces.

8. A device as defined in claim 7, wherein the higher flat surface of said two flat surfaces is normally located on the same level as the bottom surface of the other guiding shoe and a friction surface is provided adjacent said other guiding shoe normally at the same level as the lower flat surface of the guiding shoe with said two flat surfaces.

9. A device as defined in claim 2, wherein guiding shoes are provided on said shoe assembly laterally disposed on opposite sides of a vertical plane through the tilting axis, one of said guiding shoes being adjacent said friction means, and the distance from the tilting axis to the friction means is greater than the distance from the tilting axis to the other of said guiding shoes.

10. A device as defined in claim 1, wherein said mounting means includes an adjusting means enabling vertical adjustment of said shoe assembly and of said means providing the tilting axis to a position with respect to transported containers so that only lids which are incorrectly located on the containers will be engaged by the correcting shoe assembly.

References Cited

UNITED STATES PATENTS 3,112,591 12/1963 Stover _____ 53—316
3,280,534 10/1966 Hildebrandth et al. __ 53—318 X THERON E. CONDON, Primary Examiner E. F. DESMOND, Assistant Examiner U.S. Cl. X.R.

53—318